(12) United States Patent
Kazmi et al.

(10) Patent No.: US 9,900,809 B2
(45) Date of Patent: *Feb. 20, 2018

(54) METHODS AND ARRANGEMENTS IN A TELECOMMUNICATION SYSTEM

(71) Applicant: IDTP HOLDINGS, INC., Wilmington, DE (US)

(72) Inventors: Muhammad Kazmi, Bromma (SE); Bengt Lindoff, Bjärred (SE); Walter Müller, Upplands Vasby (SE); Iana Siomina, Solna (SE)

(73) Assignee: IDTP Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/363,351

(22) Filed: Nov. 29, 2016

(65) Prior Publication Data

US 2017/0078930 A1    Mar. 16, 2017

Related U.S. Application Data

(63) Continuation of application No. 14/630,888, filed on Feb. 25, 2015, now Pat. No. 9,544,867, which is a
(Continued)

(51) Int. Cl.
*H04W 4/00*    (2009.01)
*H04W 36/00*   (2009.01)
(Continued)

(52) U.S. Cl.
CPC ....... *H04W 36/0061* (2013.01); *H04W 36/30* (2013.01); *H04W 36/32* (2013.01); *H04W 64/00* (2013.01); *H04W 64/003* (2013.01)

(58) Field of Classification Search
CPC . H04W 36/0061; H04W 36/30; H04W 36/32; H04W 64/003; H04W 64/00
See application file for complete search history.

(56) References Cited

U.S. PATENT DOCUMENTS

| 8,626,170 B2 | 1/2014 | Ostrup |
| 8,700,051 B2 | 4/2014 | Burroughs |

(Continued)

FOREIGN PATENT DOCUMENTS

| EP | 893930 A2 | 1/1999 |
| EP | 930513 A2 | 7/1999 |

(Continued)

OTHER PUBLICATIONS

3rd Generation Partnership Project (3GPP), R1-091444, "Update on E-IPDL Performance", Qualcomm Europe, 3GPP TSG-RAN WG1#56bis, Seoul Korea, Mar. 23-26, 2009, pp. 1-6.
(Continued)

*Primary Examiner* — Ajit Patel
(74) *Attorney, Agent, or Firm* — Condo Roccia Koptiw LLP (57) ABSTRACT

The present invention relates to a method and a device for supporting positioning with a minimum of assistance data signalling. The method in the radio device that shall perform the positioning measurements comprises determining (440) a positioning reference signal pattern, based on a cell identity and a pre-defined mapping between the cell identity and the positioning reference signal pattern, and performing (450) positioning measurements based on the determined positioning reference signal pattern.

20 Claims, 9 Drawing Sheets

Related U.S. Application Data continuation of application No. 13/379,619, filed as application No. PCT/SE2010/050716 on Jun. 23, 2010, now Pat. No. 9,072,066.

(60) Provisional application No. 61/219,856, filed on Jun. 24, 2009.

(51) Int. Cl.
*H04W 64/00* (2009.01)
*H04W 36/30* (2009.01)
*H04W 36/32* (2009.01)

(56) References Cited

U.S. PATENT DOCUMENTS

| | | |
|---|---|---|
| 2002/0077115 A1 | 6/2002 | Ruutu et al. |
| 2003/0125044 A1 | 7/2003 | Deloach et al. |
| 2003/0148774 A1 | 8/2003 | Naghlan et al. |
| 2008/0132247 A1 | 6/2008 | Anderson |
| 2009/0047958 A1 | 2/2009 | Rimhagen et al. |
| 2009/0233621 A1 | 9/2009 | Rhoads et al. |
| 2010/0172311 A1* | 7/2010 | Agrawal ............... H04L 5/0048 370/329 |
| 2010/0195566 A1* | 8/2010 | Krishnamurthy ..... H04L 5/0007 370/328 |
| 2011/0244850 A1 | 10/2011 | Lindoff et al. |

FOREIGN PATENT DOCUMENTS

| | | |
|---|---|---|
| JP | 11-275642 A | 10/1999 |
| WO | WO 2008/016944 A2 | 2/2008 |
| WO | WO 2008/060236 A2 | 5/2008 |
| WO | WO 2008/104196 A1 | 9/2008 |
| WO | WO 2009/057729 A2 | 5/2009 |
| WO | WO 2010/118305 A2 | 10/2010 |

OTHER PUBLICATIONS

3rd Generation Partnership Project (3GPP), R1-092007, "Extension to Costas Arrays for PRS Pattern in Normal Subframes", Ericsson, 3GPP TSG RAN WG1 Meeting #57, San Francisco, USA, May 4-8, 2009, pp. 1-6.

3rd Generation Partnership Project (3GPP), R1-092008, "Comparison of PRS Patterns", Ericsson, 3GPP TSG RAN WG1 Meeting #57, San Francisco, USA, May 4-8, 2009, pp. 1-2.

3rd Generation Partnership Project (3GPP), R1-092010, "DL OTDOA Framework", 3GPP TSG RAN WG1, Meeting #57, San Francisco, USA, May 4-8, 2009, pp. 1-3.

3rd Generation Partnership Project (3GPP), R1-092213, "WF on RAN1 Concept for OTDOA", Ericsson, Alcatel-Lucent, Nokia, Nokia Siemens Networks, Qualcomm Europe, LG, Samsun, Huawei, Motorola, Pantech & Curitel, May 5, 2009, 5 pages.

European Telecommunications Standards Institute (ETSI), TS 136 211 V8.7.0, "LTE, Evolved Universal Terrestrial Radio Access (E-UTRA), Physical Channels and Modulation (3GPP TS 36.211 version 8.7.0 Release 8)", Jun. 2009, pp. 1-87.

European Telecommunications Standards Institute (ETSI), TS 136 214 V10.1.0, "LTE, Evolved Universal Terrestrial Radio Access (E-UTRA), Physical Layer, Measurements (3GPP T 36.214 version 10.1.0 Release 10)", Apr. 2011, pp. 1-15.

* cited by examiner

METHODS AND ARRANGEMENTS IN A TELECOMMUNICATION SYSTEM

CROSS REFERENCE TO RELATED APPLICATIONS

This application is a continuation of U.S. patent application Ser. No. 14/630,888 filed on Feb. 25, 2015, which is a continuation of U.S. patent application Ser. No. 13/379,619 filed on Dec. 20, 2011; which issued as U.S. Pat. No. 9,072,066 on Jun. 30, 2015, which claims the benefit of National Stage Entry application no. PCT/SE2010/050716 filed on Jun. 23, 2010; which claims benefit of U.S. provisional application No. 61/219,856 filed on Jun. 24, 2009, all of the contents of which are incorporated by reference as if fully set forth herein, and this application claims priority to all of these application and the benefit of their filing dates under 35 U.S.C. §§119(e), 120, 121, and/or 365(c).

FIELD OF THE INVENTION

The present invention relates to methods and arrangements in a telecommunication system, in particular to methods and arrangements for supporting positioning in a cellular network.

BACKGROUND

Figure 1:
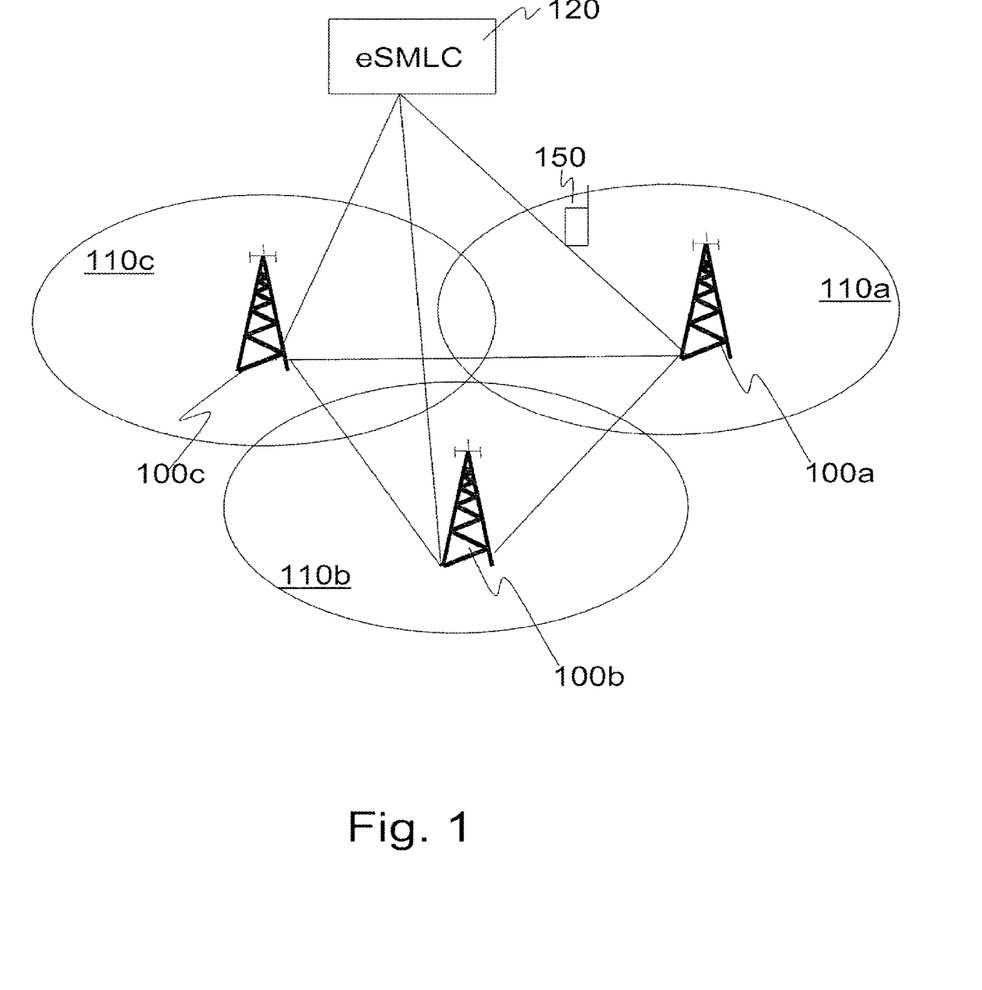
FIG. 1 illustrates schematically a part of a conventional LTE system wherein the present invention may be implemented.

The Universal Mobile Telecommunication System (UMTS) is one of the third generation mobile communication technologies designed to succeed GSM. 3GPP Long Term Evolution (LTE) is a project within the 3rd Generation Partnership Project (3GPP) to improve the UMTS standard to cope with future requirements in terms of improved services such as higher data rates, improved efficiency, and lower costs. The Universal Terrestrial Radio Access Network (UTRAN) is the radio access network of a UMTS system and evolved UTRAN (E-UTRAN) is the radio access network of an LTE system. As illustrated in FIG. 1, an E-UTRAN typically comprises user equipment (UE) 150 wirelessly connected to radio base stations (RBS) 100a-c, commonly referred to as eNodeB (eNB). The eNB controls one or more areas referred to as cells 110a-c. In FIG. 1 the UE 150 is served by the serving cell 110a. Cells 110b and 110c are neighboring cells.

Mobile user positioning is the process of determining UE coordinates in space. Once the coordinates are available, the position can be mapped to a certain place or location. The mapping function and the delivery of the location information on request are parts of the location service which is required for the basic emergency services. Services that further exploit the location knowledge, or that are based on location knowledge to offer customers some additional value, are referred to as location-aware and location-based services, respectively. The possibility of identifying a radio device's geographical location in the network has enabled a large variety of commercial and non-commercial services e.g. navigation assistance, social networking, location-aware advertising, and emergency calls. Different services may have different positioning accuracy requirements imposed by the application. Furthermore, regulatory requirements on the positioning accuracy for basic emergency services exist in some countries.

There exist a variety of positioning techniques in wireless communications networks, differing in their accuracy, implementation cost, complexity, and applicability in different environments. Positioning methods can be broadly categorized into satellite based and terrestrial methods. Global Navigation Satellite System (GNSS) is the standard generic term for satellite navigation systems that enable subscribers to locate their position and acquire other relevant navigational information. The global positioning system (GPS) and the European Galileo positioning system are well known examples of GNSS. In many environments, the position can be accurately estimated by using positioning methods based on GPS. Nowadays the networks also often have a possibility to assist UEs in order to improve the terminal receiver sensitivity and the GPS start up performance (Assisted-GPS positioning, or A-GPS). GPS or A-GPS receivers, however, are not necessarily available in all wireless terminals, and not all wireless networks have the possibility to provide or assist GPS-based positioning. Furthermore, GPS-based positioning may often have unsatisfactory performance in urban and/or indoor environments. There is thus a need for a complementary terrestrial positioning method implemented in the wireless network.

There are a number of terrestrial positioning methods, which determine the UE position by signals measured by the UE and/or by the radio network nodes such as the RBS, including:

cell identity based methods, network based uplink time difference of arrival (U-TDOA) of signals at different RBS, UE-based and UE-assisted observed time difference of arrival (OTDOA) of signals from three or more sites or locations, and fingerprinting or the pattern matching positioning method.

OTDOA is a positioning method which exploits the multi-lateration technique to calculate the UE position based on TDOA measurements from three or more locations. To enable positioning, the UE should thus be able to detect signals from at least three geographically dispersed RBS. This implies that the signals need to have high enough signal-to-interference ratios (SINR). Furthermore, the signals need to be transmitted frequently enough to meet the service delay requirements. In such a UE assisted solution, a serving mobile location centre (SMLC in GSM and UMTS, enhanced SMLC (E-SMLC) in LTE) calculates the UE position based on the positioning measurements reported by the UE. The E-SMLC 100 is either a separate network node (as illustrated in FIG. 1) or an integrated functionality in e.g. the eNB.

OTDOA positioning is using Reference Signal Time Difference (RSTD) measurements as specified in the 3GPP standard i.e. the relative timing difference between the timing of a neighbour cell and a reference cell. In a positioning report containing measurements for a number of cells, a same reference cell is used for all of the measurements. The reference cell is one of the strongest cells and very often it is the UE's serving cell, although it might sometimes be another neighbour cell. This may for example be the case when a UE cannot handover to a stronger but overloaded cell or when the UE is close to a base station serving only UEs within a closed subscriber group.

Downlink UE-assisted OTDOA is currently being discussed in 3GPP for LTE, for which it has been commonly recognized that the hearability issue needs to be addressed to enable positioning service that meets the service requirements. It has e.g. been shown that using synchronization signals (SS) and cell-specific reference signals (CRS) for positioning without interference management results in positioning coverage problems due to low SINR and/or insufficient number of strong signals from different RBS. The problem is particularly relevant for synchronized networks or networks with high data load, as there is a high probability of parallel transmissions in multiple cells on the resource elements used for CRS or SS, which leads to high interference. To address these issues and enhance positioning measurements, new physical signals, positioning reference signals (PRS), in combination with low-interference subframes have been proposed. PRS are transmitted in downlink according to a predefined PRS pattern which may differ by e.g. site, cell, or subframe. This implies that the UE needs to know what PRS pattern that is used for a certain cell, in order for it to be able to detect the PRS and perform the positioning measurements needed for the positioning services.

Positioning methods in E-UTRAN can apply so called Physical Cell Identities (PCI) as defined in the 3GPP standard. 3GPP defines 504 unique PCIs, which are intended to support efficient radio terminal UE measurement reporting procedures. The PCIs are grouped into 168 unique PCI groups, each group containing three unique identities. The grouping is such that each PCI is part of one and only one PCI group. A PCI calculated as $N_{ID}^{cell}=3N_{ID}^{(1)}+N_{ID}^{(2)}$ is thus uniquely defined by a number $N_{ID}^{(1)}$ in the range of 0 to 167 representing the PCI group, and a number $N_{ID}^{(2)}$ in the range of 0 to 2 representing the PCI within the PCI group.

The number of available unique PCIs in LTE will most likely not be enough in typical radio network deployments and therefore have to be reused, so they can be viewed as local cell identities. A network, however, will also maintain unique global cell identifiers. PCIs are planned during the network planning phase, either during initial network planning or during network re-planning and optimization, and are physically assigned to the cells as part of the initial cell configuration procedure. There exists a relation between PCIs and physical signals, which means that PCI planning has a strong impact, for example, on physical-layer procedures like the cell search performed during the initial network access or at handovers.

As already mentioned above, the candidate signals for downlink positioning measurements in LTE are the SS, the CRS, and the PRS.

Secondary Synchronization Signals (SSS):

These signals, which are followed by the primary synchronization signal (PSS) are transmitted in subframes 0 and 5 in the second last OFDM (Orthogonal Frequency Division Multiplexing) symbol of the first time slot in the indicated subframes and only in 62 resource elements, i.e. over less than six Physical Resource Blocks (PRBs) in the centre of the allocated bandwidth. The mapping between PCI and SS is described in the 3GPP standard. To ensure good cell detection performance, PCIs have to be planned to avoid the same PSS and either of the two SSS short codes in common in neighbouring cells, utilizing 3 and 168 unique sequences available for PSS and SSS, respectively. In LTE there exists a mapping between SS sequences and PCI, but not between the SS transmission pattern and PCI though, as the pattern is always the same. However, because of bad cross-correlation properties (e.g. compared to CRS) due to short sequences, infrequent transmission, and a small transmission bandwidth, SSS are not optimal candidates for positioning measurements.

Cell-Specific Reference Signals (CRS):

These signals are transmitted on resource elements in every subframe, and over the entire bandwidth. Up to six frequency shifts are possible, which are specified as a function of the PCI $k=6m+(v+v_{shift})\mod 6$, where $v=\{0,3,6\}$ (specified in 3GPP TS 36.211) and $v_{shift}=N_{ID}^{cell}\mod 6$. This corresponds in practice to a frequency re-use of six and three, for one and two (or four) transmit antennas respectively. The CRS transmission pattern is thus retrievable for a given PCI since essentially the same pattern is used applying different shifts in time (when there are four antenna ports) and frequency.

Figure 2:
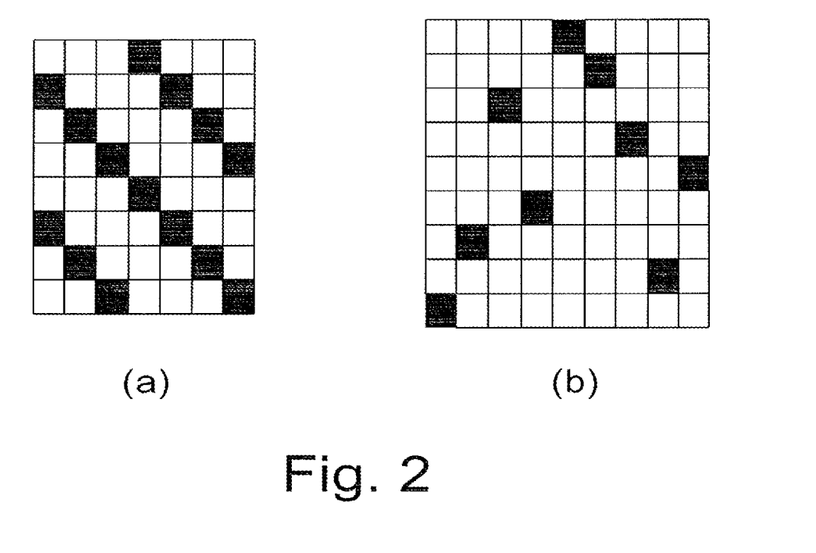
FIG. 2 illustrates two examples of patterns that have been considered for PRS, where (a) is an example of a regular pattern and (b) is an example pattern based on 9×9 Costas array.

Positioning Reference Signals (PRS):

As mentioned above, PRS are newly proposed physical signals with transmission patterns that are different from those for the standardized physical signals (e.g. SSS and CRS). Careful planning of PRS patterns among the cells in order to minimize the interference on colliding resource elements in neighboring cells is crucial for the positioning performance. PRS patterns can generally be grouped into three groups:

Regular patterns—an example of a regular pattern is illustrated in FIG. 2(a)

Random patterns

Patterns based on Latin squares, Costas arrays and Modular sonar sequences. An example of a 9×9 Costas array is illustrated in FIG. 2(b).

In general, given a set of patterns, it should be possible to group them such that all patterns within a group are orthogonal to each other, although they overlap in one or more resource elements with at least one pattern from any other group. A considerable disadvantage with random (pseudo-random) patterns is that large pattern tables may be required, which makes them less favourable for PRS since this may increase the signalling overhead and the RBS and UE complexity.

Mobility for a UE includes idle mode mobility (by means of cell reselection) and connected mode mobility (by means of handover). Cell reselection is a mainly UE autonomous function without any direct intervention of the network. However, to some extent the UE behaviour during the idle mode mobility scenario could still be controlled by broadcasted system parameters and a performance specification. Handover on the other hand is fully controlled by the network through explicit UE specific commands and by a performance specification. In both idle and connected modes the mobility decisions are mainly based on the same kind of downlink neighbour cell measurements. For example in E-UTRAN the following downlink neighbor cell measurements (measured for the serving and the neighbor cells) are specified primarily for mobility purpose:

Reference signal received power (RSRP), which is a cell-specific signal strength metric.

Reference signal received quality (RSRQ), which is a cell-specific signal quality metric, corresponding to RSRP/carrier RSSI (Received Signal Strength Indicator). RSSI is the total power received by the UE from all sources, including interfering sources, which means that the RSRQ also takes the interference into account.

RSRP and RSRQ indicate the radio conditions experienced by the UE. A lower reported value of RSRP from the serving cell will e.g. depict that the UE is far from the serving base station.

A neighbour cell list (NCL) contains, for example, cell-specific information for neighbour cells and their physical cell identities (PCI). An NCL is typically created for mobility purposes. In e.g. UTRAN, an NCL is uploaded in each NB, and cell identities comprised in the NCL are measured to support the mobility decisions. The drawback of the NCL is that it requires extensive work to keep it updated, since a change in the cell planning also affects the NCL.

In LTE, the NCL is not mandatory for mobility. The UE instead blindly detects cell identities during the cell search procedure. However, in the existing positioning solution in LTE, the information related to the PRS patterns used in the cells is signalled to the UE in the form of an NCL. A similar solution exists in the UTRAN for positioning. However the NCL is error prone, and—as already explained above— expensive to dynamically maintain and update. It is a complex task to create an NCL with cell identities that are suitable for positioning measurements, since an optimal list may depend on the UE position in the cell. Furthermore, NCLs created for mobility are not very well suited for positioning since it is important that positioning measurements are done in cells located in different sites. Therefore, NCLs for mobility and positioning are not recommended to be used interchangeably. Therefore, even if there is an NCL signaled to the UE for positioning, the UE may need to create an additional cell list for mobility purpose.

SUMMARY

The object of the present invention is to address some of the problems and disadvantages outlined above and to enable a UE to determine what positioning reference signal (PRS) patterns that are used in the cells based on a pre-defined mapping, without having to signal an explicit neighbour cell list (NCL) to the UE. This object and others are achieved by the methods and devices according to the independent claims, and by the embodiments according to the dependent claims.

A basic idea of embodiments of the present invention is to introduce a lookup table or a pre-defined mapping table in form of a standardized table for mapping PRS patterns to cell identities. Furthermore, the UE blindly detects a number of cell identities, and determines based on cell measurements—either autonomously or with the help from the network—if it may use the detected cells to retrieve the PRS patterns from the mapping table and perform the positioning measurements.

In accordance with a first aspect of the present invention, a method for a radio device in a cellular network of supporting positioning is provided. The radio device is configured to communicate with a radio base station of the cellular network. The method comprises determining a positioning reference signal pattern, based on a cell identity and a pre-defined mapping between the cell identity and a positioning reference signal pattern. It also comprises performing positioning measurements based on the determined positioning reference signal pattern.

In accordance with a second aspect of the present invention, a method for a network node in a cellular network of supporting positioning measurements in a radio device of the cellular network is provided. The method comprises receiving a cell measurement result for at least one measured cell, and the identity of said measured cells from the radio device, and determining whether to transmit a neighbour cell list comprising cell identities for positioning measurements to the radio device, based on the received cell measurement result and identity of said measured cells.

In accordance with a third aspect of the present invention, a radio device is provided. The device is configured to support positioning in a cellular network and to communicate with a radio base station of the cellular network. The radio device comprises a pattern determining unit adapted to determine a positioning reference signal pattern, based on a cell identity and a pre-defined mapping between the cell identity and the positioning reference signal pattern. Furthermore it comprises a positioning measurement unit adapted to perform positioning measurements based on the determined positioning reference signal pattern.

In accordance with a fourth aspect of the present invention, a network node is provided. The network node is configured to be used in a cellular network and to support positioning measurements in a radio device of the cellular network. The network node comprises a receiving unit adapted to receive a measurement result for at least one measured cell and the identity of said measured cells from the radio device. It also comprises a determining unit adapted to determine whether to transmit a neighbour cell list comprising cell identities for positioning measurements to the radio device, based on the received cell measurement result and identity of said measured cells.

An advantage of embodiments of the present invention is that they enable a simpler and more consistent cell planning, a reduced UE and RBS complexity, as well as less communication overhead with regards to assistance data, as an NCL is not always required by the UE to perform positioning measurements.

A further advantage of embodiments of the present invention is that NCLs only are used when necessary, which enhances the positioning measurement quality. NCLs often incorporate errors since what is defined as a neighbour cell may depend on the position of the UE in a cell.

Still another advantage of embodiments of the present invention is that the amount of effort for maintaining NCLs is reduced, since the positioning measurements are not dependent on a completely updated NCL from the network. As already described above, the creation and maintenance of an optimal NCL involves considerable effort and backhaul communication.

Other objects, advantages and novel features of the invention will become apparent from the following detailed description of the invention when considered in conjunction with the accompanying drawings.

DETAILED DESCRIPTION

In the following, the invention will be described in more detail with reference to certain embodiments and to accompanying drawings. For purposes of explanation and not limitation, specific details are set forth, such as particular scenarios, techniques, etc., in order to provide a thorough understanding of the present invention. However, it will be apparent to one skilled in the art that the present invention may be practiced in other embodiments that depart from these specific details.

Moreover, those skilled in the art will appreciate that the functions and means explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as in a system comprising a computer processor and a memory coupled to the processor, wherein the memory is encoded with one or more programs that may perform the functions disclosed herein.

The present invention is described herein by way of reference to particular example scenarios. In particular, embodiments of the invention are described in a non-limiting general context in relation to an E-UTRAN. It should though be noted that the invention and its exemplary embodiments may also be applied to other types of radio access networks supporting positioning, such as WiMAX, CDMA 2000 and Wireless LAN as well as LTE evolutions such as LTE-A.

In embodiments of the present invention, the problems of using NCL for signaling cell identities to a radio device such as a UE, a small base station, a relay, or a repeater, are addressed by a solution where a PRS pattern for a certain cell is determined by using a pre-defined mapping between the cell identity and the PRS pattern. Furthermore, the UE blindly detects a number of cell identities, and determines based on cell measurements if it may use the detected cells to retrieve the PRS patterns and perform the positioning measurements.

A possibility to determine a PRS pattern e.g. from a physical-layer cell identity (PCI) is a very desirable feature to enable PRS detection without extra communication overhead, and to allow for consistent positioning service planning and regular cell planning to keep the overall network planning and optimization efforts at a reasonable level. This is particularly important in networks that are meant to be self-optimizing and self-configuring in as many aspects as possible.

In one embodiment of the present invention, a pre-defined PCI-to-PRS mapping is used by a radio device for determining the PRS pattern, which is then used to perform positioning measurements. There are two main aspects associated with the mapping between PCI and PRS patterns. The first aspect relates to the principles for pre-defined PCI-to-PRS mapping tables, and the second one relates to the determination of PRS patterns from a pre-defined PCI-to-PRS mapping table.

Various principles for mapping a PRS pattern to the cell identity (i.e. PCI) and for creating a pre-defined mapping or lookup table are disclosed below. First the general principles will be described, where it is assumed that PRS patterns can be grouped into $N_1$ groups with $N_2$ patterns each, where:

$PPI^{(1)} \in \{0, \ldots, N_1-1\}$ is the PRS pattern group identity,
$PPI^{(2)} \in \{0, \ldots, N_2-1\}$ is the PRS pattern identity within a PRS pattern group, where $N_2$ is the number of PRS patterns within the group.

$X(PPI^{(1)}, PPI^{(2)})$ is the pattern in group $PPI^{(1)}$ with the identity $PPI^{(2)}$ inside the group, and the pattern is a matrix of size M×K.

It is reasonable to assume that within each group, all the patterns are orthogonal to each other. They may e.g. be frequency-shifted or time-shifted like in Costas-array based patterns. Each group can thus be specified by a set of the following three arguments:

1. The group reference pattern, which may e.g. be a Costas array.
2. A shift, e.g. a vertical shift (v_shift) corresponding to a frequency shift, or a horizontal shift (h_shift) corresponding to a time shift.
3. The number of patterns within the group denoted by $N_2$ ($N_2 \leq M$ if the group is generated by frequency shifts and $N_2 \leq K$ if the group is generated by time shifts).

Let X be a M×K binary matrix with, e.g., ones corresponding to PRS resource elements and, e.g., zeros for resource elements without PRS transmission. A frequency shift of X by v_shift*$PPI^{(2)}$ is a matrix operation D(v_shift*$PPI^{(2)}$,M)*X, where D(v_shift*$PPI^{(2)}$,M) is a M×M matrix with ones along two diagonals: diagonal (v_shift*$PPI^{(2)}$) mod M and diagonal -(M-v_shift*$PPI^{(2)}$) mod M. Given a group reference matrix $X_{ref}(PPI^{(1)})$, the resulting pattern X is given by:

$$X(PPI^{(1)}, PPI^{(2)}) = D(v\_shift*PPI^{(2)}, M)*X_{ref}(PPI^{(1)})$$

In a similar way, when time shifting is applied within a group, the resulting pattern X is given by:

$$X(PPI^{(1)}, PPI^{(2)}) = X_{ref}(PPI^{(1)})*D(h\_shift*PPI^{(2)}, K).$$

One possible association between PCI and PPI is $PPI^{(1)}$=floor(PCI/K) and $PPI^{(2)}$=PCI mod K. In a system operating on multiple frequencies, in order to simplify network planning, the same PPIs can be reused on different frequencies in co-located sites.

Starting from the above general description various exemplary embodiments of pre-defined table mappings are possible. Some specific examples A-D are described below:

A. Pre-Defined Table Based on a Single Group of Orthogonal Patterns:

In one embodiment of the present invention, there is only one group of orthogonal PRS patterns, i.e. $N_1$=1. The PRS pattern is thus identified only by a pattern identity $PPI^{(2)}$, a shift step and the number of patterns within the group denoted by $N_2$, as already described above. The shift may e.g. be a frequency shift, or a time shift, or a combination of both. In this case only one reference pattern have to be stored. One possible association between PCI and $PPI^{(2)}$ is $PPI^{(2)}$=PCI mod $N_2$.

B. Pre-Defined Table Based on Independent Group Reference Patterns:

In a further embodiment, the group reference patterns are independent of each other and may or may not be orthogonal to each other. In an example, such group reference patterns could be based on different Costas arrays. In this case, M patterns would have to be stored.

Figure 3:
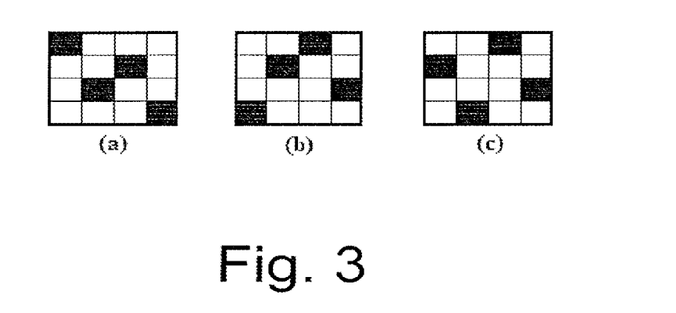
FIG. 3 illustrates a PRS pattern example (a), which is frequency shifted in (b), and time-shifted in (c).

C. Pre-Defined Table Based on Common Reference Pattern:

In another embodiment, there exists a reference pattern common for all groups, so that the group reference patterns can be derived as a function of the common reference pattern and the positioning pattern group identity $PPI^{(1)}$. For example, if frequency shifting is used to generate patterns within each group, horizontal time shifting with respect to the common reference pattern could be used to generate group reference patterns, and vice versa. Only one pattern (common reference) would have to be stored and the others could be derived. Time-shifting for the reference group patterns with respect to common reference pattern $X_{ref}$ can be formulated as $X_{ref}(PPI^{(1)}) = X_{ref}*D(h\_shift*PPI^{(1)}, K)$. A simple example is illustrated in FIG. 3, where (a) and (b) belong to the same positioning pattern group (i.e. have the same $PPI^{(1)}$) and (c) belongs to a different positioning pattern group. The pattern in (a) illustrates the group reference pattern ($PPI^{(1)}=0$, $PPI^{(2)}=0$). The pattern in (b) is the group reference pattern in (a) frequency shifted with a shift step v_shift=1, $PPI^{(1)}=0$, $PPI^{(2)}=1$, and thus belong to the same positioning pattern group as (a) (i.e. have the same $PPI^{(1)}$). The pattern in (c), is the group reference pattern in (a) time-shifted with a shift step h_shift=2, $PPI^{(1)}=1$, $PPI^{(2)}=0$, and thus belongs to a different group than that in (b).

D. Pre-Defined Table Based on Sub-Cell Group Pattern:

In some possible deployment scenarios, several spatially distributed antennas may be associated with a cell. For data communication, it may not be necessary to distinguish between the antennas, but rather to apply combining signals received from the different antennas in the receiver. For positioning purpose, receiving signals from distinct locations is crucial, which however requires identification associated with each antenna site. Given a set of subcell identities (each associated with a remote antenna in the example above) denoted by $PPSI \in \{0, \ldots, L-1\}$, where L is the number of reserved identities, and a set S of patterns reserved for subcells, one could find the PRS pattern for subcell PPSI (PRS Pattern Subcell Identity), for example, as S(PPSI). In one embodiment, the set of patterns for subcells is a group of orthogonal patterns (e.g. frequency-shifted), and the sets may be derived as a function of the associated cells, e.g. the subcell pattern could be $S(PPI^{(1)}, PPI^{(2)}, PPSI)$. In an example, if the reference group patterns are based on distinct Costas arrays and frequency shift is applied within each group, then a horizontal shift (time shift) could be applied to generate the set of subcell patterns, i.e. only M patterns would have to be stored and all the other patterns, both for regular cells and subcells, could then be derived for given $PPI^{(1)}$, $PPI^{(2)}$, and PPSI as $$X(PPI^{(1)},PPI^{(2)},PPSI)=X(PPI^{(1)},PPI^{(2)})*D(h\_shift\_subset*PPSI,K),$$

where for PPSI=0 D(h_shift_subset*PPSI) is an identity matrix, i.e. the associated cell pattern will be used in the subcell.

Regardless of what pre-defined mapping table that is used for mapping the PRS pattern to the cell identity (i.e. any of the alternative embodiments described above), the UE should be capable of determining the PRS pattern used in a cell. Therefore, in one embodiment of the present invention, the UE first blindly detects the cell identity of a cell. Once the cell identity is found, the UE may use the pre-defined mapping table to identify the PRS pattern used in that cell. In order to ensure that it has correctly determined the PRS pattern, the UE may in one embodiment perform correlation over the PRS pattern. Once the UE knows the transmission pattern that is used for PRS, it knows which resource elements that shall be selected for the signal check, and the UE may perform correlation over those resource elements. If the correlation results are above a certain threshold, the UE shall assume that the pattern is correct and that the right signal has been detected. Otherwise the UE shall assume that the signal cannot be detected and the reason could be that the wrong pattern has been determined.

Furthermore, the UE may use the same procedure to determine PRS patterns used in other detected cells. Eventually, the UE will use the determined PRS patterns to perform the required positioning measurements, e.g. the measurements of the observed time difference of arrival of signals from different cell. The positioning measurements are then reported to the network node with positioning functionality, which may be a radio base station or a specific E-SMLC node, where the positioning of the UE is determined based on the reported OTDOA measurements. In this embodiment, no NCL is signaled to the UE. However, the cells that the UE blindly detects may not always fulfill the requirements for positioning measurements.

Therefore, embodiments of the present invention use a combination of a pre-defined mapping table, the list of blindly detected cells and the neighbour cell list (NCL)—which is signaled by the network and contains neighbour cell identities—to determine the PRS patterns under certain conditions. The following describes four alternative embodiments:

1. Event Triggered Use/Signalling of Neighbour Cell List (NCL) Based on Signal Quality:

In this first embodiment the UE blindly detects cell identities and finds the PRS pattern from the available pre-defined mapping table. The UE also performs cell measurements, e.g. signal quality measurements such as RSRP or RSRQ measurements in LTE, for the detected cell identities, and reports the measurements and/or events to the network. These measurements are conventionally performed for normal mobility reasons. Depending upon the reported measurements and/or events, the serving radio network node (i.e. serving cell) decides whether to send assistance data comprising the NCL to the UE or not. For instance if the RSRP measured from the serving cell (or from the reference cell used in the RSTD measurements if that is another cell than the serving cell) is above a first threshold—which means that the UE is close to the serving eNB—the serving cell sends the assistance data with the NCL to the UE to facilitate detecting a sufficient number of cells at different locations/eNB sites. On the other hand when the serving cell RSRP is low enough (below or equal to the first threshold) then the serving cell may not send any assistance data/NCL to the UE. Instead the network assumes that the UE is able to blindly detect sufficient cells for performing the positioning measurements (e.g. OTDOA).

2. Event Triggered Use/Signalling of Neighbour Cell List (NCL) Based on Number of Reported Cells:

In this second embodiment, the decision of the serving network node (i.e. serving cell) whether to send the assistance data containing the NCL to the UE or not is based on the total number of cells (particularly belonging to different locations/sites) detected by the UE. For example, in case the reported number of neighbour cells based on the blind detection is below a second threshold (e.g. only two neighbour cells detected), the serving cell sends the assistance data containing the NCL to the UE to facilitate the detection of a required number of cells for accurate determination of the UE position. The information about the number of detected cells can be acquired by the serving cell based on the neighbour cell events/measurements reported by the UE. Another possible embodiment is that the network sends assistance data containing NCL to the UE to assist it to detect more cells if the network does not receive the UE positioning measurements reports (e.g. OTDOA measurements) from sufficient cells. In summary, the UE uses the pre-defined mapping table and the detected cells to derive the PRS pattern if the number of detected cells is above the second threshold (e.g. four or five if the threshold is three), and otherwise, i.e. if the number of detected cells is below or equal to the second threshold, it uses the signaled NCL to find the corresponding PRS pattern.

3. Event Triggered Use/Signalling of Neighbour Cell List (NCL) Based on Combination of Signal Quality and Number of Reported Cells:

According to this third embodiment the network decides whether to signal the NCL to the UE based on both signal quality and the number of cells reported by the UE. For example, if the number of detected cells (based on blind detection) is above the second threshold and the signal quality (e.g. RSRP) measured in the serving cell is below the first threshold, the UE uses the pre-defined mapping table and the detected cells to derive the PRS pattern. In this case the network does not signal any NCL to the UE. Otherwise, if the number of detected cells is below the second threshold and the signal quality (e.g. RSRP) measured from the serving cell is above the first threshold, the UE uses the signaled NCL to find cell and the corresponding PRS pattern. This means the network will signal NCL to the UE when both conditions are met. This third embodiment is the combination of the two previously described embodiments. The first and second threshold values (i.e. number of cells, signal quality etc.) used in these three embodiments (first, second, and third described above) may e.g. be pre-defined in the standard.

4. Use of Neighbour Cell List Autonomously Decided by UE:

According to this fourth embodiment the network always signals NCL to the UE, regardless of the UEs radio condition (e.g. signal quality) and the number of cells detected. However, the UE autonomously and selectively decides when to use the detected cells and when to use the NCL to derive the PRS pattern. The use of NCL depends on if certain conditions are met or not, similarly to what is described in the first, second and third embodiment above, e.g. the total number of detected cells, and the signal quality (e.g. RSRP) level from the serving/reference cell. These measures are part of the result from the cell measurements performed for the blindly detected cells.

In one example of the fourth embodiment, the number of detected cells (based on blind detection) is above a second threshold (e.g. four or five). The UE thus uses the list of blindly detected cells and the pre-defined mapping table to derive the PRS pattern. Otherwise, i.e. if the detected cells are fewer or equal to the second threshold, the UE uses the NCL which is signaled by the network and which is already available at the UE.

In a second example of the fourth embodiment, the UE uses the list of detected cells and the pre-defined mapping table to derive the PRS pattern if the signal quality (e.g. RSRP) measured from the serving cell is below the first threshold. Otherwise, i.e. if the signal quality is above or equal to the threshold, the UE uses the NCL which is signaled by the network.

In a third example of the fourth embodiment, the UE uses the list of blindly detected cells and the pre-defined mapping table to derive the PRS pattern if the number of detected cells is above the second threshold and/or if the signal quality (e.g. RSRP) measured from the serving cell is below the first threshold. Otherwise, e.g. if the number of detected cells is equal to or below the second threshold and the signal quality (e.g. RSRP) measured from the serving cell is equal to or above the first threshold, the UE uses the signaled NCL to find the corresponding PRS pattern. The threshold values (i.e. the thresholds for number of cells, the signal quality, etc.) may in these examples of the fourth embodiment be UE implementation specific, pre-defined in the standard, or signaled to the UE by the network.

The main difference between this fourth embodiment and the previously described three embodiments is that the NCL is always signaled to the UE, and that the decisions regarding the use of NCL or the detected cells for deriving the PRS pattern are independently taken by the UE. However, if the threshold values mentioned above are signaled by the network, the UE behavior is to a certain extent controlled by the network.

In a fifth embodiment of the present invention, which may be combined with the fourth embodiment described above, the NCL received from the network may be improved by e.g. adding detected cell identities that are not part of the NCL. Another possibility is to substitute a cell identity in the NCL by a detected cell identity. The criteria for when a UE decides to use the detected cells in addition to the NCL or instead of some cells in the received NCL is that the UE believes that the detected cell has a better quality than one of those received in the NCL. The decision may e.g. rely on a timing estimate such as the expected RSTD parameter or the estimated distance, i.e. the delay, to the transmitter. The expected RSTD is comprised in the assistance data signalled by the network, and the estimated distance may e.g. be deduced from the expected RSTD for the reference cell corresponding to the estimated timing (or distance) for the reference cell. The estimated timing (distance) for a neighbour cell would thus be a difference between the expected RSTD and the estimated timing for the reference cell.

In a sixth embodiment which may be combined with one of the first, second, or third embodiments described above when it is the network node that decides whether to send an NCL to the UE or not, the network node may improve the NCL based on the list of blindly detected cells received from a UE in a measurement report. It should be noted that the detected cells may be received from one UE, but it may be the NCL for another UE in approximately the same area that is improved based on that information. The network node maintains a database for the assistance data build-up and the neighbour cell list in particular, so that the database is updated upon receiving a cell measurement result. The network node receives the cell measurement result for the detected cells, and the list of measured cell identities, and compares the list of measured cell identities with the NCL cell identities. Based on the differences between the lists of cell identities, i.e. measured cell identities that are not part of the NCL, it may update the database used for the assistance data build-up and for creating the NCL for radio devices that are to be positioned. This updated database may then be used for building up the assistance data and creating NCLs, also for other positioning methods than the current. The database may in alternative embodiment be used for radio network planning and/or for resource management.

In accordance with a fifth embodiment, a network node maintains a database for the assistance data build-up and the neighbour cell list in particular, so that the database is updated upon receiving a measurement report comprising at least positioning measurements and the corresponding neighbour cell list.

Figure 4A:
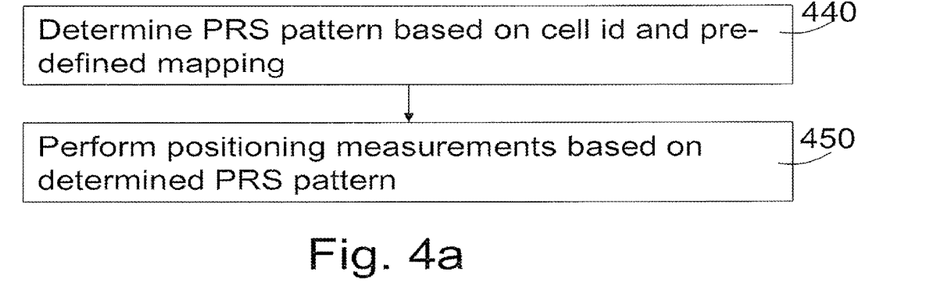
FIGS. 4*a-e* are flowcharts of the methods in the radio device according to embodiments of the present invention.

FIG. 4a is a flowchart of the method in the radio device according to one embodiment of the present invention. The radio device may in one embodiment be a UE. It may alternatively also be a small RBS, a relay, or a repeater. The method illustrated in the flowchart comprises the following:

440: Determine a PRS pattern, based on a cell identity and a pre-defined mapping between the cell identity and the PRS pattern. The pre-defined mapping may be found in a table, and any of the mapping principles described above may be applied. In one embodiment, there is one single group of orthogonal PRS patterns, and a pattern is identified based on a horizontal frequency shift and the total number of patterns within the group. In alternative embodiments, the shift may also be a time shift, possibly in combination with the frequency shift.

In still another embodiment, there is more than one group of orthogonal patterns, and the pattern identity within the group is complemented with the pattern group identity.

450: Perform positioning measurements based on the determined PRS pattern. The positioning measurements may then be transmitted to the network node responsible for the positioning.

Figure 4B:
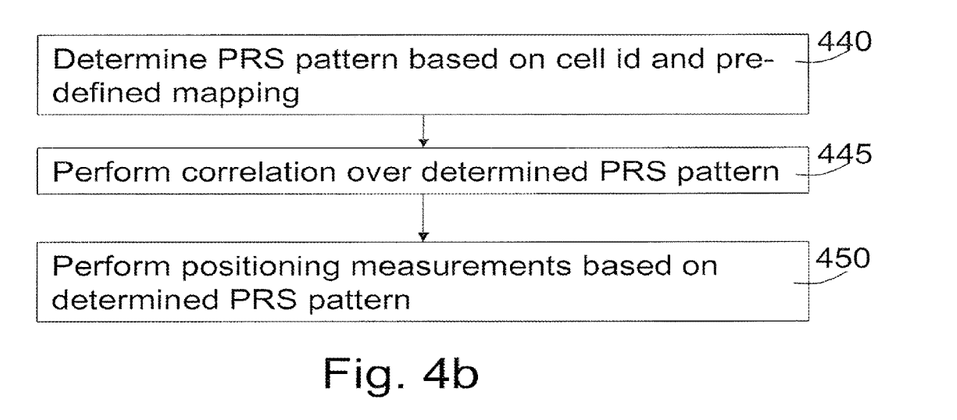

FIG. 4b is a flowchart of the method described with reference to FIG. 4a, with the addition of a correlation performed 445 over the determined PRS pattern to ensure that the PRS pattern is correctly determined before performing positioning measurements in 450.

Figure 4C:
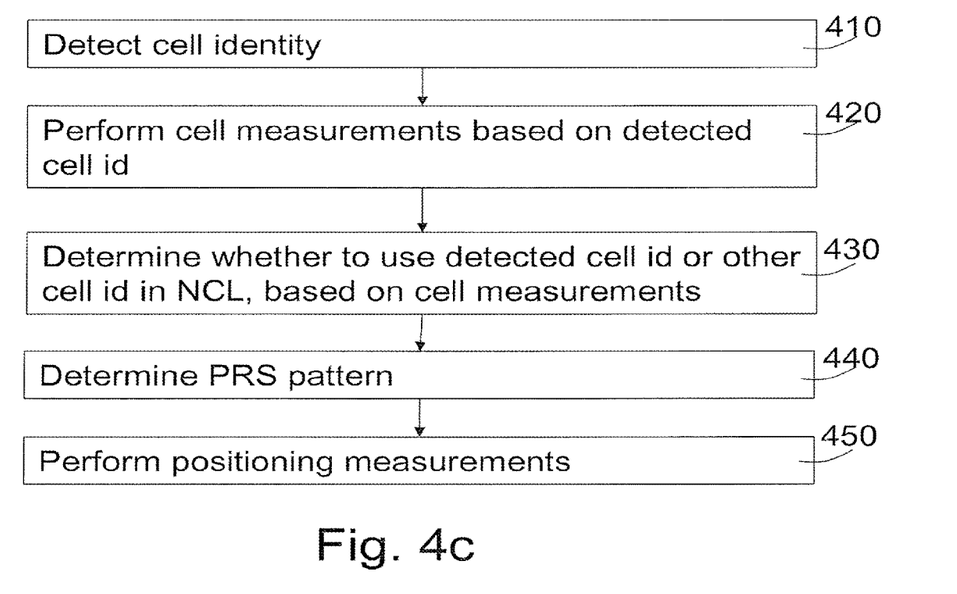

FIG. 4c is a flowchart of the method in the radio device according to other embodiments of the present invention. In these embodiments, the method comprises the following:

410: Detect at least one cell identity. The UE may do a blind detection of neighbour cells and their identity, as is done in the cell search procedure.

420: Perform cell measurements for each of the detected cell identities. The cell measurements are e.g. measurements of signal strength and quality.

430: Determine whether to use the detected cell identities or other cell identities in an NCL received from the network for determining the PRS patterns, based on the cell measurements. This may either be done by transmitting the cell measurements to the network, and let the network control what cell list to use, as in the first, second and third embodiment described above, or the decision is taken in the UE autonomously as described in the fourth embodiment.

440: Determine a PRS pattern, based on either the detected cell identity or a cell identity from the NCL list depending on the result in 430, and a pre-defined mapping between the cell identity and the PRS pattern.

450: Perform positioning measurements based on the determined PRS pattern.

Figure 4D:
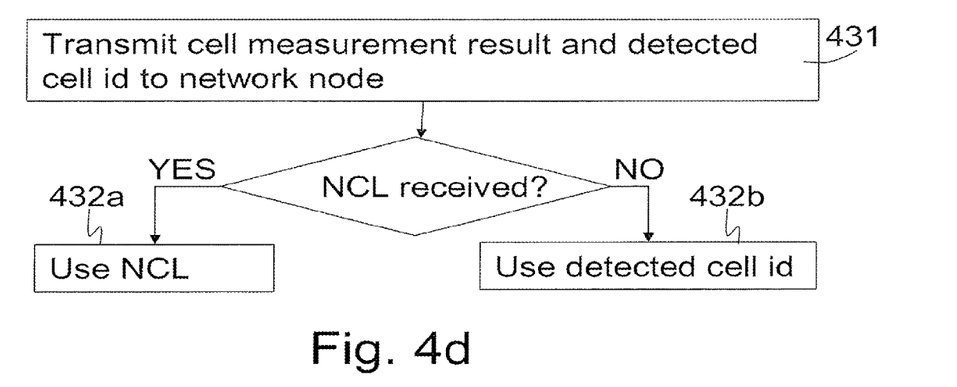

FIG. 4d is a flowchart of the method in the radio device according to the first, second or third embodiments of the present invention described above. In these embodiments, the method step 430 comprises the following:

431: The cell measurement results from the detected cells and the detected cell identities are transmitted to the network node responsible for the positioning. This may be a node with positioning functionality such as an E-SMLC, or an eNB in E-UTRAN. This is done in order for the network node to determine whether to transmit the NCL to the UE or not.

432: The UE determines to use the cell identities in the neighbour cell list 432a, in case the NCL is received from the network node, and determines to use the detected cell identities 432b, in case the NCL is not received from the network node.

Figure 4E:
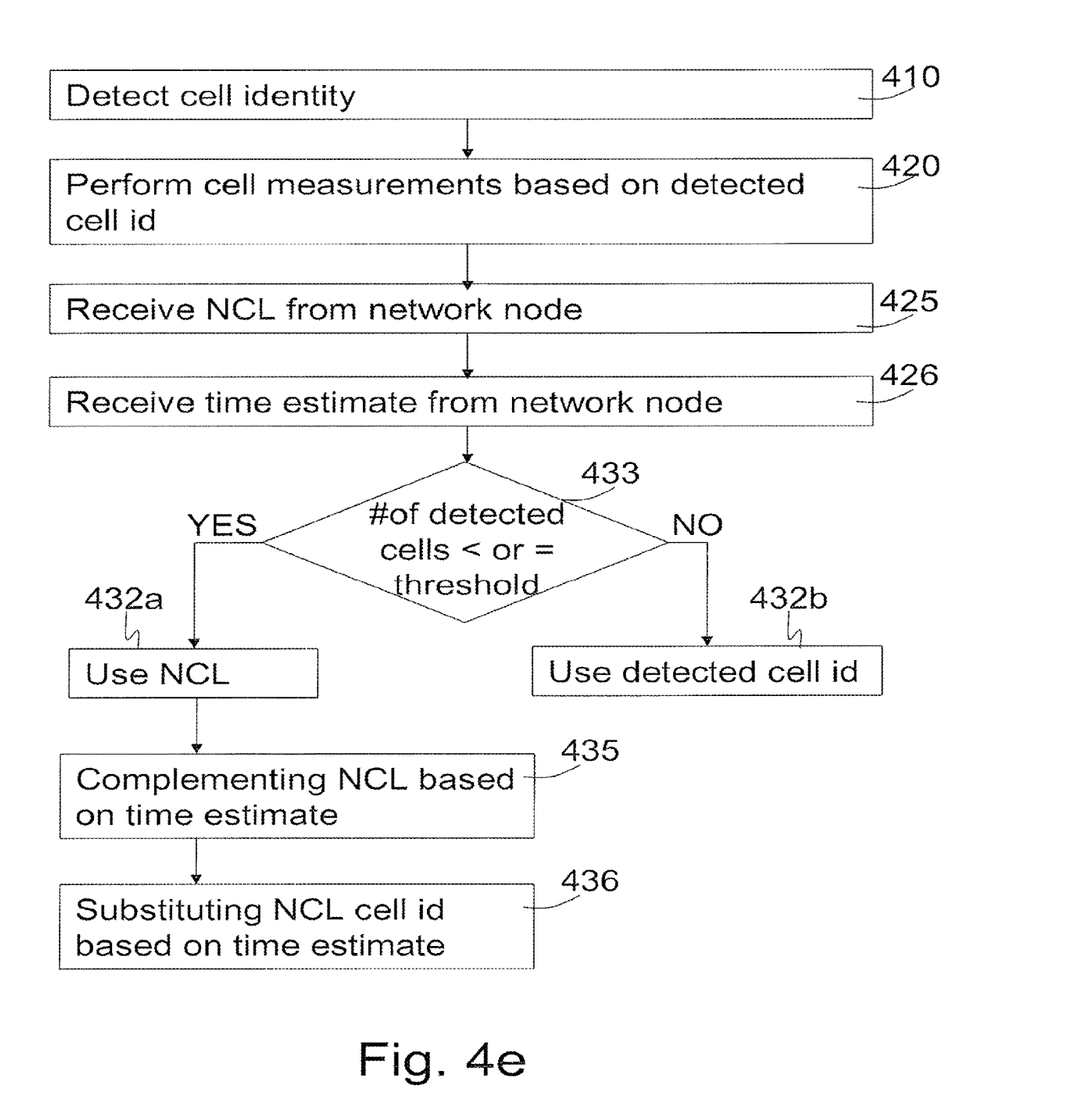

FIG. 4e is a flowchart of the method in the radio device according to the fourth embodiment of the present invention described above. In this embodiment the UE detects cell identities in 410, and performs cell measurements for these cells in 420 as already described above. Furthermore, the UE will always receive, in 425, an NCL from the network. In this fourth embodiment, the method step 430 comprises the following:

433: Compare a total number of detected cells, with threshold values. The total number of detected cells is comprised in the result from the cell measurements. In an alternative embodiment it is a signal quality from a reference cell which is compared with a first threshold instead, or a combination of both as described previously.

432: Determine to use the cell identities in the NCL, in 432a, if the total number of detected cells is equal to or below the second threshold value, and otherwise determine to use the detected cell identities, in 432b.

The flowchart of the method in the radio device in FIG. 4e, also comprises receiving 426 a timing estimate from the network node, according to the fifth embodiment described above. In this embodiment, if it is determined to use the cell identities comprised in the neighbour cell list, in 432a, the method further comprises complementing, in 435, the cell identities comprised in the neighbour cell list with at least one of the detected cell identities, and/or substituting, in 436, at least one of the cell identities comprised in the neighbour cell list with at least one of the detected cell identities, based on the received timing estimate.

Figure 5A:
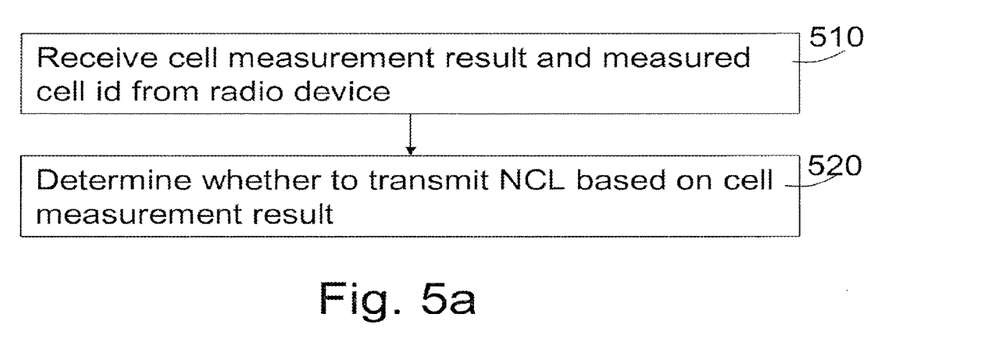
FIGS. 5*a-b* are flowcharts of the methods in the network node according to embodiments of the present invention.

FIG. 5a is a flowchart of the method in the network node according to the first, second or third embodiment described above. The network node may in one embodiment be a positioning node such as an E-SMLC, communicating with a radio device such as a UE. The network node may alternatively also be an RBS comprising positioning functionality. The method illustrated in the flowchart comprises the following:

510: Receive a cell measurement result for one or more measured cells and the identities of the measured cells from the radio device. The radio device has blindly detected a number of cell identities, which it sends to the network node together with the cell measurement report.

520: Determine whether to transmit an NCL comprising cell identities for positioning measurements to the radio device, based on the received cell measurement result and identities of the measured cell. In one embodiment, the network node determines to transmit an NCL when the signal quality measure of the reference cell is equal to or above a first threshold value. In an alternative embodiment, the network node determines to transmit an NCL when the total number of measured cell identities is equal to or below a second threshold value. In still another alternative embodiment, the network node determines to transmit an NCL when the signal quality measure of the reference cell is equal to or above the first threshold value, and when the total number of measured cell identities is equal to or below the second threshold value.

Figure 5B:
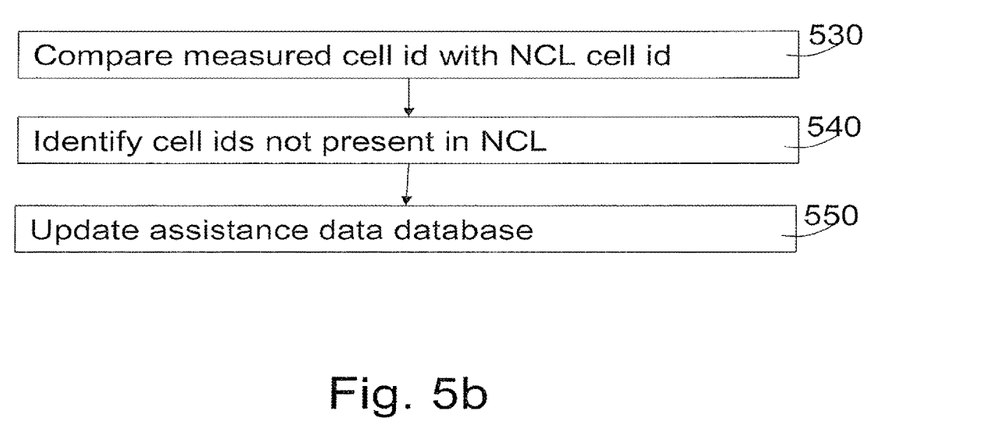

FIG. 5b is a flowchart of the method in the network node according to the sixth embodiment described above. The method illustrated in the flowchart comprises the following, in addition to the method in FIG. 5a:

530: Compare the measured cell identities with the cell identities comprised in the NCL sent earlier in the assistance data.

540: Identify cell identities not present in the NCL based on the comparison.

550: Update the assistance data database with the identified cell identities. The database may be used for building up assistance data for other positioning measurements, for radio network planning, and/or for resource management.

Figure 6A:
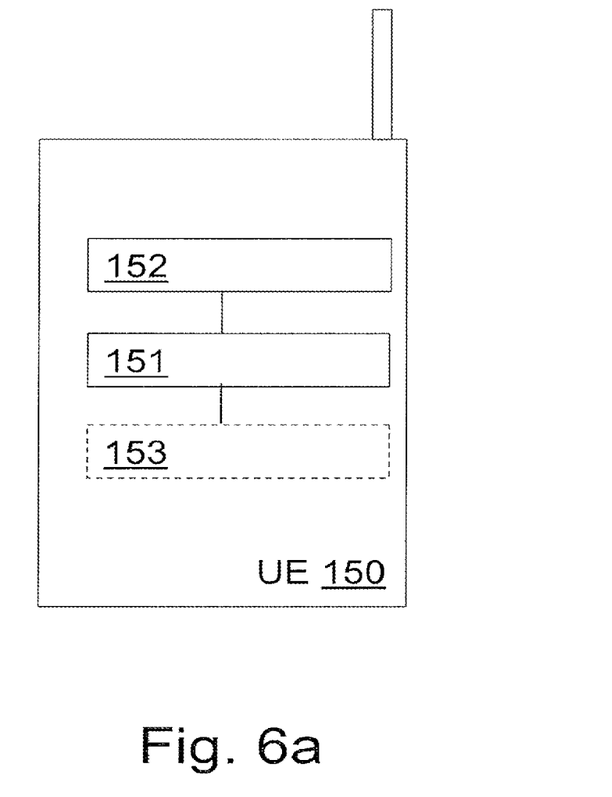
FIGS. 6*a-c* illustrate schematically the network node and the radio device according to embodiments of the present invention.

The radio device 150, which is a UE in one embodiment, is schematically illustrated in FIG. 6a, according to embodiments of the present invention. The radio device 150 is configured to support positioning in a cellular network and to communicate with a radio base station of the cellular network. The radio device comprises a pattern determining unit 151 adapted to determine a PRS pattern, based on a cell identity and a pre-defined mapping between the cell identity and the positioning reference signal pattern, and a positioning measurement unit 152 adapted to perform positioning measurements based on the determined PRS pattern. The PRS pattern may be one of a first group of orthogonal patterns, and is identified by a shift and a total number of patterns in the first group. The shift may be a frequency shift, and/or a time shift. In one embodiment there is only this single first group of PRS patterns, but in an alternative embodiment, the first group of patterns is one of a second group of pattern groups, as described above where it is assumed that PRS patterns can be grouped into $N_1$ groups with $N_2$ patterns each. The first group is a group of patterns, i.e. the $N_2$ patterns of one pattern group. The second group is the group of pattern groups, i.e. the $N_1$ groups. The PRS pattern is in this case further identified by a pattern group identity (one of the $N_1$ groups). The radio device 150 may in one embodiment also comprise a correlating unit 153 adapted to perform a correlation over the determined PRS pattern to ensure that it is correctly determined before performing the positioning measurements.

Figure 6B:
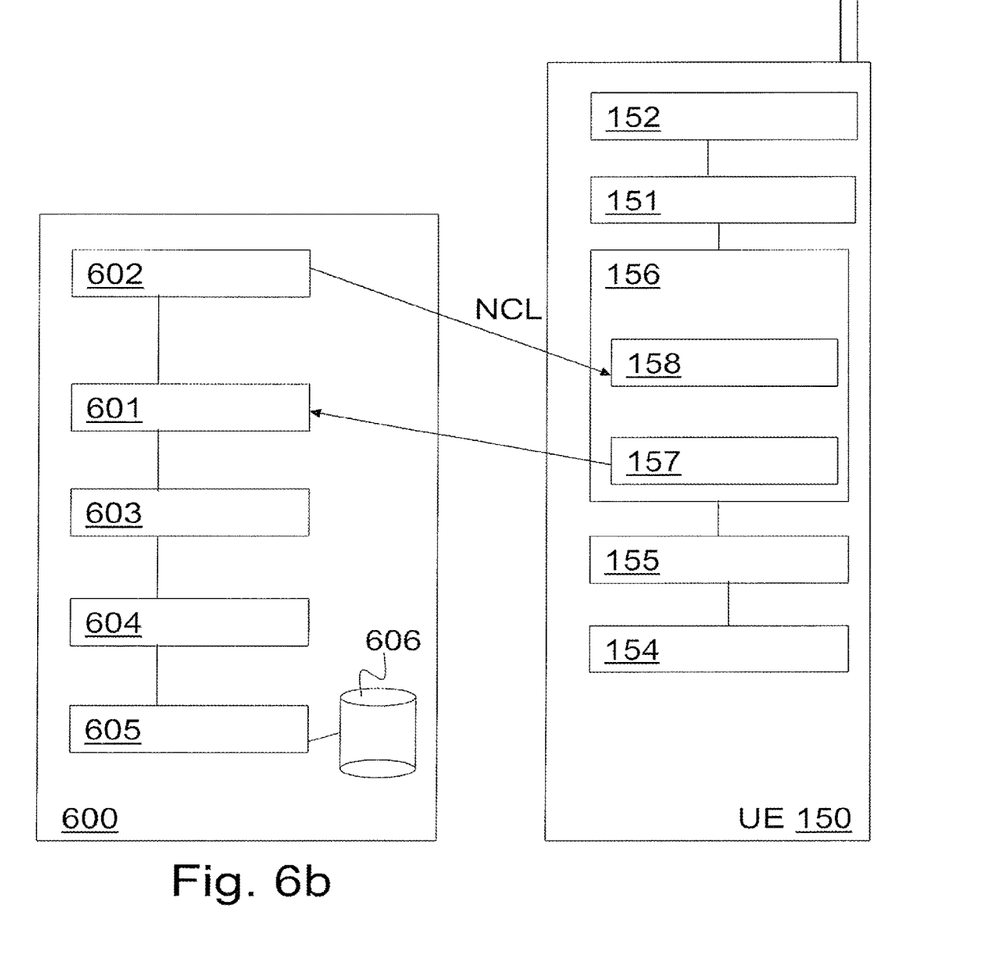

The network node 600 and the radio device 150 are schematically illustrated in FIG. 6b, according to the first, second, third and sixth embodiments of the present invention. In addition to the pattern determining unit 151 and the positioning measurement unit 152 described with reference to FIG. 6a, the radio device 150 further comprises a detecting unit 154 adapted to detect at least one cell identity, and a cell measurement unit 155 adapted to perform cell measurements based on the detected cell identities. Furthermore it comprises a determining unit 156 adapted to determine whether to use the detected cell identities or cell identities in an NCL received from the network node for determining the PRS patterns. The determining unit 156 further comprises a transmitting unit 157 adapted to transmit a result from the cell measurements and the detected cell identities to the network node, and a receiving unit 158 adapted to receive the NCL from the network node. Furthermore, the determining unit 156 is adapted to determine to use the cell identities in the NCL, if it is received from the network node, and to use the detected cell identities, if the NCL is not received.

The network node 600, which may be an RBS with positioning functionality or a specific positioning node such as the E-SMLC in E-UTRAN, is configured to be used in a cellular network and to support positioning measurements in a radio device 150 such as a UE or a small RBS or repeater. The network node 600 comprises a receiving unit 601 adapted to receive a measurement result for at least one measured cell and the identities of the measured cells from the radio device 150. It also comprises a determining unit 602 adapted to determine whether to transmit an NCL comprising cell identities for positioning measurements to the radio device 150, based on the received identities of the measured cells and cell measurement result. The determining unit 602 may be further configured to determine to transmit the NCL when the signal quality measure received with the measurement result is equal to or above a first threshold value. Alternatively, the determining unit 602 may be further configured to determine to transmit the NCL when the total number of measured cells is equal to or below a second threshold value. The network node 600 further comprises, according to the sixth embodiment described above, a comparing unit 603 adapted to compare the identities of the measured cell with the cell identities comprised in the NCL, and an identifying unit 604 adapted to identify cell identities not present in the NCL based on the comparison. It also comprises a database updating unit 605 adapted to update an assistance data database 606 with the identified cell identities. Data from the updated database 606 may be used for building up assistance data for other positioning measurements, for radio network planning, and/or for resource management.

Figure 6C:
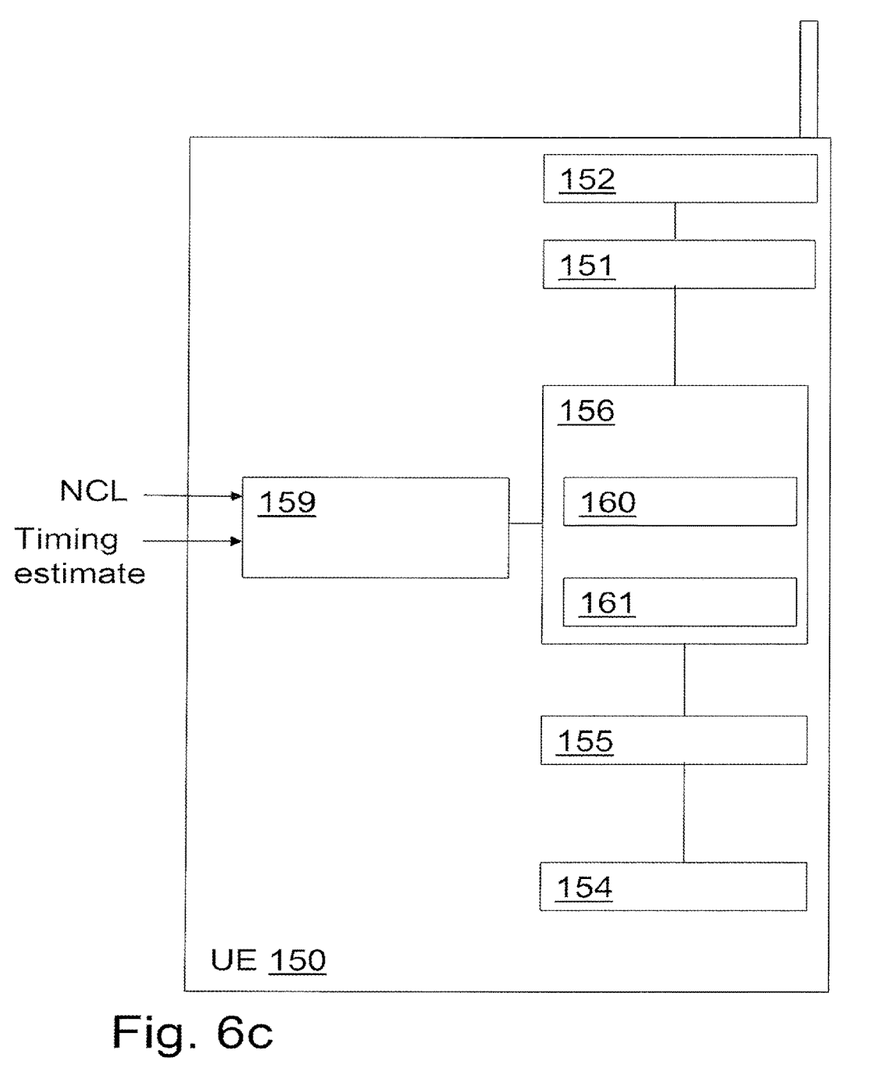

The radio device 150 is also schematically illustrated in FIG. 6c, according to the fourth and fifth embodiments of the present invention described above. In addition to the pattern determining unit 151, the positioning measurement unit 152, the detecting unit 154, and the cell measurement unit 155 described with reference to FIGS. 6a and 6b, the radio device 150 further comprises a receiving unit 159 adapted to receive the NCL from the network node. Furthermore, the determining unit 156 further comprises a comparing unit 160 adapted to compare either a signal quality measurement for a reference cell with a first threshold value, or a total number of detected cells with a second threshold value, or both. The signal quality measurement and the total number of detected cells are comprised in the result from the cell measurements. The determining unit 156 is also further adapted to determine to use the cell identities in the NCL if the signal quality measure is equal to or above the first threshold value, and to use the detected cell identities if the signal quality measure is below the first threshold value. Alternatively, the determining unit 156 is further adapted to determine to use the cell identities in the NCL if the total number of detected cells is equal to or below the second threshold value, and to use the detected cell identities in case the total number of detected cells is above the second threshold value. A combination of the embodiments is also possible. According to the fifth embodiment described above, the receiving unit 159 is further adapted to receive a timing estimate from the network node, and the determining unit 156 further comprises a complementing unit 161 adapted to complement the cell identities comprised in the NCL with at least one of the detected cell identities, and/or to substitute at least one of the cell identities comprised in the NCL with at least one of the detected cell identities, based on the received timing estimate.

The above mentioned and described embodiments are only given as examples and should not be limiting to the present invention. Other solutions, uses, objectives, and functions within the scope of the invention as claimed in the accompanying patent claims should be apparent for the person skilled in the art.

Abbreviations

3GPP 3rd Generation Partnership Project
A-GPS Assisted GPS
ASIC Application Specific Integrated Circuit
CRS Cell-specific Reference Signal
eNodeB evolved Node B
E-SMLC Enhanced SMLC
E-UTRAN evolved UTRAN
GNSS Global Navigation Satellite System
GPS Global Positioning System
LTE Long-Term Evolution
NCL Neighbour cell list
OFDM Orthogonal Frequency Division Multiplexing
OTDOA Observed Time Difference Of Arrival
PCI Physical Cell Identities
PPI PRS Pattern Identity
PPSI PRS Pattern Subcell Identity PRS Positioning Reference Signal
PSS Primary SS
RBS Radio Base Station
RSRP Reference symbol received power
RSRQ Reference symbol received quality
RSTD Reference Signal Time Difference
SINR Signal-to-interference ratio
SMLC Service Mobile Location Centre
SS Synchronization Signal
SSS Secondary SS
UE User Equipment
UMTS Universal Mobile Telecommunications System
U-TDOA Uplink Time Difference Of Arrival
UTRAN Universal Terrestrial Radio Access Network

The invention claimed is:

1. A wireless transmit/receive unit (WTRU) comprising:
a processor configured to:
   determine a plurality of physical cell identities (PCIs) that each correspond to a cell within a plurality of cells that are within a wireless communication network;
   for each cell of the plurality of cells, determine at least a frequency shift associated with a positioning reference signal pattern, for the cell, based on the physical cell identity of the cell;
   perform observed time distance of arrival (OTDOA) measurements in accordance with the positioning reference signal patterns for each of the plurality of cells; and
   send a measurement report to a network node based on the OTDOA measurements; and
a receiver configured to receive communications from the wireless communications network.

2. The WTRU of claim 1, wherein the processor is further configured to receive a neighbor cell list (NCL) comprising the PCIs for each of the plurality of cells.

3. The WTRU of claim 1, wherein the frequency shift for each of the plurality of cells is determined based on the function PPI=PCI mod N2, where PPI represents the frequency shift of the cell, PCI represents the physical cell identity of the cell, and N2 represents the number of shift steps for positioning reference signals.

4. The WTRU of claim 1, wherein the processor is further configured to receive assistance information for the OTDO measurements.

5. The WTRU of claim 2, where in the processor is further configured to select a first group of cells in the NCL and to determine the frequency shift associated with the positioning reference signal patterns for each cell in the first group of cells.

6. The WTRU of claim 1, further comprising a memory and wherein the processor is further configured to store in the memory each of the positioning reference signal patterns with a mapping to one of the plurality of physical cell identifies.

7. The WTRU of claim 6, wherein the mapping is stored in the memory in a table format.

8. The WTRU of claim 6, where in the mapping is predefined.

9. The WTRU of claim 6, where in the processor is further configured to determine each of the positioning reference signal patterns by comparing each of the plurality of cell identities to the mapping stored in memory.

10. The WTRU of claim 9, wherein the processor is further configured to correlate a received signal with the mapping and determine whether the correlation was satisfactory by comparing the correlation to a threshold.

11. A method of using a wireless transmit/receive unit (WTRU) comprising:
determining a plurality of physical cell identities (PCIs) that each correspond to a cell within a plurality of cells that are within a wireless communication network;
for each cell of the plurality of cells, determining at least a frequency shift associated with a positioning reference signal pattern, for the cell, based on the physical cell identity of the cell;
performing observed time distance of arrival (OTDOA) measurements in accordance with the positioning reference signal patterns for each of the plurality of cells; and
sending a measurement report to a network node based on the OTDOA measurements.

12. The method of claim 11, further comprising the WTRU receiving a neighbor cell list (NCL) comprising the PCIs for each of the plurality of cells.

13. The method of claim 11, wherein the WTRU determines the frequency shift for each of the plurality of cells based on the function PPI=PCI mod N2, where PPI represents the frequency shift of the cell, PCI represents the physical cell identity of the cell, and N2 represents the number of shift steps for positioning reference signals.

14. The method of claim 11, further comprising the WTRU receiving assistance information for the OTDO measurements.

15. The method of claim 12, further comprising the WTRU selecting a first group of cells in the NCL and determining the frequency shift associated with the positioning reference signal patterns for each cell in the first group of cells.

16. The method of claim 11, further comprising the WTRU storing in memory each of the positioning reference signal patterns with a mapping to one of the plurality of physical cell identifies.

17. The method of claim 16, wherein storing comprises storing the WTRU mapping each of the positioning reference signal patterns in the memory in a table format.

18. The method of claim 16, wherein the mapping is predefined.

19. The method of claim 16, further comprising the WTRU determining each of the positioning reference signal patterns by comparing each of the plurality of cell identities to the mapping stored in memory.

20. The method of claim 19, further comprising the WTRU correlating a received signal with the mapping and determining whether the correlation was satisfactory by comparing the correlation to a threshold.

* * * * *